Feb. 6, 1934.   J. H. SMOOT   1,945,710
REPRODUCING DEVICE
Filed Dec. 7, 1929
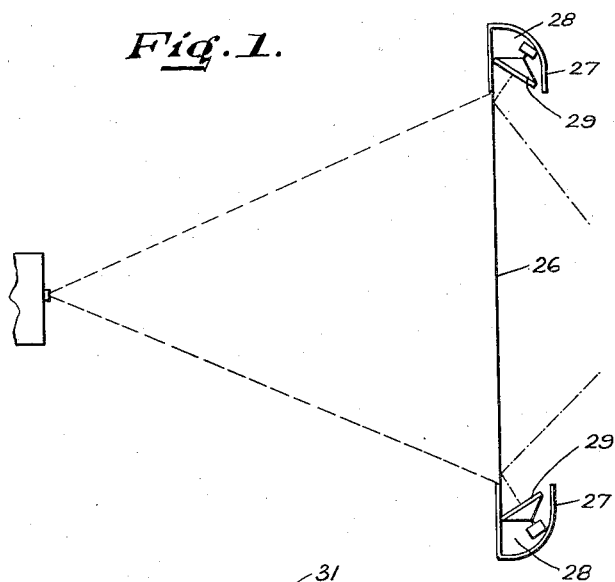
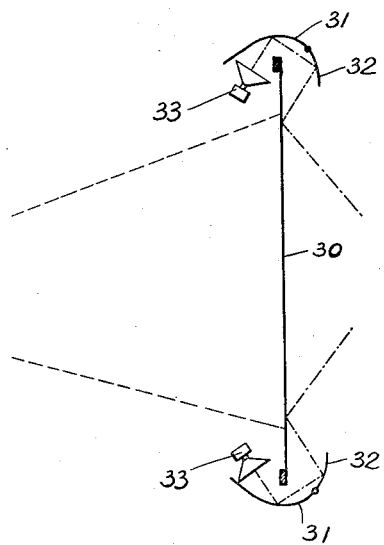
INVENTOR.
John H. Smoot.
BY Duell, Dunn & Anderson.
ATTORNEYS.

Patented Feb. 6, 1934

1,945,710

UNITED STATES PATENT OFFICE 1,945,710

REPRODUCING DEVICE

John H. Smoot, New York, N. Y., assignor to Trans-Lux Daylight Picture Screen Corporation, New York, N. Y., a corporation of Delaware Application December 7, 1929. Serial No. 412,357

3 Claims. (Cl. 88—16.2)

This invention relates to a functionally and structurally improved reproducing device capable of use in numerous different associations but ideally adapted to provide a light image receiving surface such as may be used in connection with motion pictures and, in addition, to furnishing an apparatus for setting up sound waves.

By means of the present invention an apparatus is furnished which will reproduce sounds with maximum volume and clarity and with a minimum of parasitic sound waves, and the sounds thus produced will appear to emanate directly from the light images appearing upon the screen.

A further object of the invention is that of furnishing an apparatus of this character which may be constructed at relatively nominal cost and which will operate over long periods of time with freedom from mechanical or other difficulties and which will not require the services of an expert operator.

With these and other objects in mind reference is had to the attached drawing illustrating practical embodiments of the invention and in which:—

Figure 1 is a transverse section of one form of the invention; and

Figure 2 is a similar view of another form.

The present invention contemplates the provision of means whereby sound waves are reproduced which have the illusion of emanating from the body of the screen itself. In this connection attention is invited to the accompanying drawing.

In Figure 1, the numeral 26 indicates a screen preferably of translucent material and which may be provided with a frame or bordering portion 27 providing a compartment 28 marginally disposed with respect to the screen. This compartment may house reproducers of any desired type. Preferably, these units which have been indicated at 29 are of the dynamic type and are arranged to direct sound waves against the body of the screen from which they will be reflected towards the audience. In this connection, it will be appreciated that the frame presents a confining compartment preventing to a maximum extent the escape of trains of sound waves other than by first impinging against the surface of the screen or traversing a path substantially parallel thereto. Obviously, by extending the reproducing elements of the several units at proper angles, the sound will be reflected in exactly the direction best suited to the acoustical properties of the theater in which the screen is provided.

Referring to the form of apparatus shown in Fig. 2, the screen 30 is again preferably of translucent material lending itself to rear projection of light images and the frame 31 extends around the margin of the screen and may terminate in an adjustable portion 32, capable of being swung with respect to the frame body. By positioning a battery of reproducing units 33 to the rear of this screen and beyond the light image portion thereof, the sound waves will be deflected as shown, and will appear to emanate from the face of the screen. By the provision of the adjustable reflector portions, it is feasible to control to a great extent this illusion and also to some extent the volume directed to the auditorium.

In both of these forms, it will be noted that the audience will not see the battery of reproducers but will merely view the light image as projected from the rear. The sound waves will have the illusion of coming from the visually displayed figures and objects upon the screen and the conditions confronting this installation may readily be compensated for by having the sound waves reflect at just the proper angle.

From the foregoing, it will be appreciated that among others, the several objects of the invention, as specifically aforestated, are achieved. It will, moreover, be understood that numerous changes in construction and rearrangements of the parts might be resorted to, and that the reproducer need not necessarily serve as a light image receiving screen. Also, by means of the present invention, it is primarily contemplated to provide a screen capable of reproducing sounds and to be used in connection with rear projection, but that front projection may also be employed in connection therewith.

Having described my invention, what I claim as new and desire to secure by Letters Patent, is:

1. A reproducing device including a sheet of translucent material, a shield adjacent the edge thereof and a battery of substantially fixed reproducers also disposed adjacent the edge of said sheet, said shield and reproducers cooperating to direct sound waves against the sheet and to reflect such sound waves from the surface thereof.

2. A combined sound and image reproducing device comprising a screen, separate sound reproducing means disposed in front of and near the outer edge of said screen, and a shield forming an extension of said screen partially encasing said sound reproducing means so as to direct the sound waves towards the face of said screen.

3. A combined sound and image reproducing device comprising a screen, separate sound reproducing means disposed in the rear of and near the outer edge of said screen, and a shield partially encircling the sound reproducing means and extending over the edge of said screen towards the face thereof for directing the sound waves towards the face of the screen.

JOHN H. SMOOT.